United States Patent Office 3,720,697
Patented Mar. 13, 1973

3,720,697
PREPARATION OF ORTHO-SUBSTITUTED ARYL PHOSPHINES AND METAL COMPLEXES
Donald M. Fenton, Anaheim, Calif., assignor to Union Oil Company of California, Los Angeles, Calif.
No Drawing. Filed Mar. 1, 1971, Ser. No. 119,836
Int. Cl. C07f 15/00
U.S. Cl. 260—429 R                 11 Claims

ABSTRACT OF THE DISCLOSURE

A method is described for the preparation of monocyclic aryl compounds of trivalent Group V–A elements wherein the aryl substituent is substituted in its ortho position with a halogen, alkyl, aryloxy or alkyloxy substituent. The resultant compound is useful as a ligand in the preparation of metal complexes, such as complexes of palladium and platinum, which are catalysts for hydrocarbon conversions such as oxidations or hydroformylations. The method for the ortho substitution of the aromatic compounds comprises the reaction of a palladium or platinum chelate of the aromatic compound with substituting agents such as halogen or halide for the halogen-substituted, an alkyl halide for the alkyl-substituted, or an alkyl or aryl orthoformate ester for the alkoxy or aryloxy-substituted compound. Suitable chelates for reaction in this method of synthesis are disclosed in my application, Ser. No. 873,641, filed Nov. 3, 1969, now Pat. No. 3,622,607.

DESCRIPTION OF THE INVENTION

This invention relates to a method for the ortho substitution of aromatic compounds of trivalent Group V–A elements and metal complexes formed therefrom, and, in particular, relates to the ortho substitution of aromatic phosphines.

The various organic compounds of trivalent Group V–A elements having atomic numbers greater than 15, i.e., phosphorus, arsenic, antimony and bismuth, have found increasing application as cocatalysts for various catalysis with transition metals. Typical of such applications is the use of hydrocarbyl phosphines, arsines, stilbines, or bismuthines as cocatalysts with Group VIII metals such as cobalt or rhodium for the liquid phase homogeneous catalysis of the hydroformylation of olefins. The aromatic compounds, i.e., compounds possessing at least one aromatic substituent bonded to the Group V–A element, exhibit a high degree of actitvity for cocatalysis, particularly when employed in combination with a Group VIII noble metal such as rhodium, palladium, iridium, etc. It is desirable to employ these aromatic Group V–A compounds with ortho substituents on the aromatic group since these ortho substituents can cause steric hindrance or crowding around the metal atom in the resulting complex and thereby alter the nature of the catalysis to effect changes in reaction rates, product distribution, etc. It is also possible to change the compound from a biphyllic ligand to a chelating agent by furnishing another dentate position, e.g., a halogen in the ortho position to the Group V–A element.

Unfortunately, however, the conventional synthesis of these trivalent Group V–A element compounds does not afford a facile method for the preparation of ortho substituted aromatic compounds. A typical preparation involves the reaction of phosphorus trichloride with benzene in the presence of a Friedel-Crafts catalyst. Substituents on the benzene reactant either inhibit this reaction or direct the substitution to non-ortho positions so that the resulting product is often a mixture of isomers which contains very little of the ortho substituent. Similarly, synthesis with a Grignard reagent does not provide a convenient preparation for the ortho substituted aromatic compounds because of the interference of an ortho substituent with the preparation of the Grignard reagent or its reaction.

I have now found, however, that ortho substitution of aromatic compounds of trivalent Group V–A elements can be readily achieved by the reaction of palladium or platinum chelates of the aromatic compound with an ortho-substituting reactant. The chelates of palladium are described in my copending application, Ser. No. 873,641, filed Nov. 3, 1969, now Pat. No. 3,622,607.

The platinum chelates have similar sructure and are described in Chemical Communications, pages 1176-7, 1970. Briefly, these chelates have the following structure:

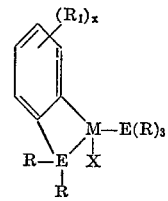

wherein E is a trivalent Group V–A element having an atomic number of at least 15; the R groups can be the same or different alkyl, cycloalkyl or aryl, and the $R_1$ groups are suitable inert groups as hereinafter defined; and
M is palladium or platinum.

The aforementioned chelates can be reacted with a halide substituting reactant such as a hydrohalic acid, gem-halo-alkane or elemental halogen to open the chelate structure and substitute a halogen in the ortho position of the aromatic group that is bonded to the palladium or platinum in the aforeindicated structure. This preparation, illustrated with hydrogen chloride, is as follows:

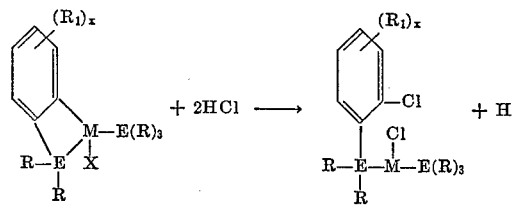

The aforementioned noble metal chelate can also be reacted with an alkyl substituting reactant such as an alkyl non-gem halide to open the chelate structure and substitute the aromatic ring with an alkyl group in the ortho position which was bonded to the noble metal in the chelate. This reaction is as follows:

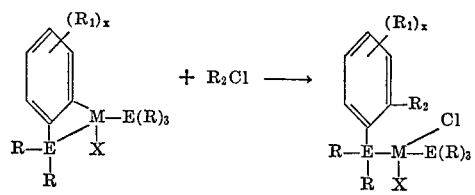

The chelate can also be reacted with an aroxy or alkoxy substituting reactant such as a chloro orthoformate ester of an aryl or alkyl alcohol to open the chelate ring and substitute an aroxy or alkoxy group in the ortho position of the aromatic ring which was previously bonded to the Group VIII noble metal. This reaction proceeds as follows:

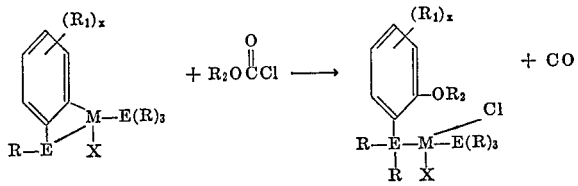

Any of the aforementioned reactions can be performed under relatively mild conditions including temperatures from 30° to 300° C. and pressures from 1 to about 1000 atmospheres, preferably, sufficient to maintain liquid phase conditions.

When the biphyllic ligands employed in the chelate reactant contain more than one aromatic group, the reaction can be repeated to substitute one ortho carbon of each of the aromatic groups of the biphyllic ligand or ligands which are present in the chelate structure. The reaction is quantitatively selective to substitute only the ortho position of the aromatic ring.

The reaction can also be performed at the aforedescribed conditions using the chelate precursors as reactants rather than the preformed chelate. In this embodiment, a source of palladium or platinum, such as any hereinafter described as suitable sources for the chelate preparation, can be charged to the reaction zone together with a source of the anionic X reactant, also hereinafter described, and the ortho-substituting reactant. In the chelate preparation, palladium or platinum salts are used for ease of preparation. When the ortho-substituting reactant is a halogen or hydrohalic acid, the metals, of course, can be used since they are dissolved into solution as the halide salts by these reactants. The reaction can be performed under liquid phase conditions in the same manner described hereinafter for formation of the chelate. Preferably, the reaction is also conducted in the presence of an acid acceptor such as the various basic materials described hereinafter with regard to the chelate formation.

Upon completion of the ortho-substituting reaction, the biphyllic ligands can be recovered in a quantitative yield from their complex with the noble metal by reaction with a suitable cyanide, e.g., an alkali metal cyanide which, in liquid phase, is effective to extract the noble metal from the complex and liberate the biphyllic ligands. A typical procedure for the cyanide extraction is disclosed in Pat. No. 3,530,190 which is incorporated herein by reference. These ligands can thereafter be used to form chelates with any of the transition metals.

The chelate which is reacted in accordance with this invention can be any chelate having the following structure:

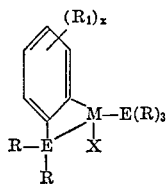

wherein E is a trivalent Group V–A metal having an atomic number of at least 15, e.g., phosphorus, arsenic, antimony or bismuth, preferably phosphorus;
M is platinum or palladium;
X is halide, hydroxy or alkanoid having 2 to about 12 carbons;
R are the same or different alkyl having 1 to 14 carbons, preferably 3 to 10 carbons, e.g., methyl, ethyl, butyl, nonyl, dodecyl, tetradecyl, etc.; cycloalkyl having from 5 to about 10 carbons e.g., cyclopentyl, methylcyclopentyl, cyclohexyl, cycloheptyl, ethylcyclohexyl, cyclooctyl, cyclodecyl, etc.; or aryl having from 6 to 10 carbons, e.g., phenyl, tolyl, cumenol, pseudocumenol, xylyl, durlyl, etc. preferably aryl;
$R_1$ are the same or different inert groups of alkyl having from 1 to about 5 carbons, cycloalkyl having from 5 to about 10 carbons or halo; and
$x$ is an integer from 0 to 3.

The $R_1$ groups are inert, i.e., chemically unreactive, with the reactants and products under the reaction conditions. Examples of these are methyl, ethyl, propyl, isopropyl, isopropyl, t-butyl, amyl, cyclopentyl, cyclohexyl, methylcyclopentyl, ethylcyclohexyl, cycloheptyl, cyclooctyl, chloro, bromo, iodo, fluoro, etc. The $R_1$ groups should be chosen or positioned to minimize steric interference with the ortho-substituting reaction. Thus, the preferred position for a ring substituent, if any is present, is para to the position of the Group V–A element. Substituents can be present in the meta positions, and it is preferred that any substituent in the meta position be non-bulky, i.e., that it be halo or normal alkyl. This is particularly preferred when both meta positions bear substituents to insure that the ortho substituting reaction of this invention is not sterically blocked or hindered.

The halides and alkanoates which can be X in the preceding formula are exemplified by fluoride, iodide, acetate, propionate, butyrate, valerate, caproate, caprylate, etc. Halides are preferred and chloride is a preferred halide.

It is also preferred, particularly when M is platinum, that the R group be aryl, cycloalkyl or a tertiary alkyl such as tertiary butyl, 1,1-dimethylpropyl, 1,1-diethyloctyl, etc. These bulky R groups are preferred because of the greater ease with which the chelate structure can be formed between the Group VIII noble metal, particularly platinum, and the biphyllic ligands.

The halo substitution of an aromatic component of the ligand according to reaction I is achieved by reaction with suitable halide reactants. The halide reactant then can be elemental halogen, e.g., bromine, iodine, fluorine, chlorine; a hydrogen halide, e.g., hydrogen chloride, hydrogen bromide, hydrogen iodide or hydrogen fluoride; or gem-haloalkanes having from 1 to about 5 carbons, e.g., carbon tetrachloride, carbon tetrabromide, carbon tetraiodide or carbon tetrafluoride, 1,1,1-trichloroethane, 1,1,1-triiodobutane, etc.

When the reaction is performed to prepare an alkyl substituted aryl ligand, the reactant, according to reaction II, is a non-gem alkyl halide. Various alkyl halides can be used including those which are entirely alkyl as well as those which contain monocyclic aryl constituents having from 1 to about 12 carbons. Typical examples of the alkylating agents include methyl chloride, propyl bromide, ethyl iodide, butyl chloride, tetriarybutyl chloride, 2-ethylhexyl fluoride, amyl bromide, decyl chloride, dodecyl iodide, octyl chloride, benzyl chloride, p-methylbenzyl chloride, 3,5 - dimethylbenzyl chloride, 2 - phenylpropyl chloride, 3-pseudocumylbutyl chloride, etc.

The chloroorthoformate ester of various alkyl and aryl hydroxyl compounds can also be used to prepare the aroxy or alkoxy substituted aromatic ligand according to reaction III. These chloro orthoformate esters have the following structure:

wherein R can be alkyl having from 1 to about 12 carbons or monocyclic aryl having from 6 to about 12 carbons, e.g., methyl chloroformate, ethyl chloroformate, propyl chloroformate, isopropyl chloroformate, t-butyl chloroformate, amyl chloroformate, hexyl, chloroformate, isooctyl chloroformate, decyl chloroformate, dodecyl chloroformate, phenyl chloroformate, benzyl chloroformate, tolyl chloroformate, xylyl chloroformate, cumenyl chloroformate, p-butylphenyl chloroformate, etc.

The reactions are performed under relatively mild conditions including temperatures from 30° to about 300° C. and pressures from about 1 to 1000 atmospheres, preferably from 1 to about 10 atmospheres. Most preferably, the pressure is not significantly greater than that which is sufficient to maintain liquid phase conditions under the reaction temperature. Generally the reaction can be performed at atmospheric pressure under refluxing conditions. The time of the reaction is sufficient to obtain substantial conversion of the aromatic ligand to the ortho substituted aromatic ligand. The use of extended reaction periods and/or the use of an excess amount of the substituting reactant and acid acceptor will insure that all of the aromatic groups of the chelate are substituted with one substituent in the ortho position.

Upon completion of the reaction, the chelate of the ortho-substituted ligand and noble metal can be recovered by cooling and filtration. The ortho-substituted ligand can also be recovered free of any chelation with the noble metal by treatment of the reaction product with an alkali metal or hydrogen cyanide in the manner described in Pat. 3,530,190. Suitable cyanides include hydrogen cyanide; ammonium cyanide; alkali metal cyanide, e.g., sodium, lithium, potassium, cesium cyanides; alkaline earth metal cyanides, e.g., beryllium, magnesium, calcium, strontium, barium cyanides, etc. The Group II-B metal cyanides, zinc, cadmium and mercuric cyanides, are also water soluble and useful.

The cyanide can be dissolved in the extraction liquid in a concentration from 0.01 to 20 weight percent; preferably from 1 to 5 weight percent calculated as the cyanide group.

The pH of the aqueous extract is preferably from 7 to 11 and, most preferably, is from 8 to 10. Alkaline materials such as ammonium or alkali metal hydroxide can be incorporated in the solution to raise its pH to the desired value. Concentration of the base can be from 0.1 to about 25; preferably from 1 to about 15 weight percent.

The extraction can be effected simply by contacting the extraction liquid with the products of the reaction of this invention in a batch or continuous manner.

The contacting can be effected at any suitable temperature from about 5° to about 250° C. Preferably, the temperature is from 15° to 125° C. and should be below the decomposition temperature of the particular cyanide dissolved in the extraction liquid.

The resultant admixture is then separated by decanting or centrifuging the liquid to separate the aqueous extract containing the noble metal as a cyano complex from the organic liquid containing the ortho-substituted, monocyclic aryl, Group V-A element compound. The latter compound can be purified by known methods such as extraction, distillation or crystallization.

As disclosed in the aforementioned prior application and publication, the chelate reactants employed in the invention may be prepared by contacting palladium or platinum ion, a biphyllic ligand and a halide, hydroxyl or alkanoid in the presence of an acid acceptor. The formation of the chelate proceeds as illustrated with palladium as follows:

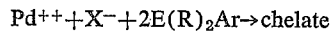

The palladium or platinum can be added as a salt, preferably as a halide, hydroxide or alkanoates, depending on the desired identity of the X component of the chelate. Suitable sources of these are palladium chloride, platinum chloride, palladium iodide, palladium bromide, platinum fluoride, alkaloids having from 1 to about 5 carbons such as palladium acetate, platinum acetate, palladium propionte, platinum butyrate, palladium valerate, platinum valerate, etc.

The source of the anionic X reactant may be any compound which on dissolution yields the X anions, e.g., acids, hydroxides, or salts such as sodium hydroxide, potassium chloride, magnesium chloride, sodium acetate, potassium propionate, potassium butyrate, ammonium hydroxide, acetic acid, valeric acid, octanoic acid, etc. Preferably, for convenience, a palladium or platinum salt, e.g., palladium chloride, platinum acetate, palladium valerate, etc., is used. The biphyllic ligand employed is one which is previously described and has at least one aromatic group which is unsubstituted in the ortho position.

The chelate formation is performed under liquid phase conditions and can be conducted in the presence of a suitable inert liquid which is inert to the reactants and under the contacting conditions and which, preferably, is a solvent for the reactants and chelate. Suitable liquids include hydrocarbons, carboxylic acids, ketone, ethers, esters and alcohols, etc. The preferred liquids are the $C_2$-$C_{20}$ carboxylic acids, e.g., acetic acid, propionic acid, butyric acid, pivalic acid, octanoic acid, benzoic acid, toluic acid, dodecanoic acid, etc., preferably a $C_2$-$C_{12}$ fatty acid. Other suitable liquids are exemplified by hydrocarbons such as hexane, heptane, benzene, toluene; ketones such as acetone, methylethyl ketone, diisopropyl ketone, cyclohexanone; ethers such as di-n-butyl ether, methyl m-tolyl ether; esters such as methyl acetate, ethyl n-butyrate; or alcohols such as methanol, ethanol, propanol, butanol, octanol, etc. The $C_1$-$C_{12}$ alkanols, e.g., methanol, ethanol, propanol, etc., are preferred solvents when a hydroxy-type chelate is to be synthesized.

The preparation of the chelate is preferably conducted in the presence of an acid acceptor, i.e., a material which, when added to an acid solution, increases the pH of the solution. Suitable acid acceptors include the alkali and alkaline earth metal hydroxides, carbonates, arsenates, borates and oxides, e.g., sodium hydroxide, potassium hydroxide, calcium hydroxide, sodium carbonate, calcium oxide, lithium arsenate, sodium borate, cesium borate, etc., hydrazine, ammonium hydroxide, a $C_1$-$C_5$ alkyl amine, e.g., butyl amine, tripropyl amine, etc., and the alkali and alkaline earth metal $C_1$-$C_{12}$, preferably $C_2$-$C_5$. alkanoates, e.g., lithium acetate, sodium propionate, potassium pivalate, cesium butyrate, potassium acetate, lithium laurate, etc. The fatty acid carboxylates are generally preferred, and the hydroxides are most preferred acid acceptors when a hydroxyl type chelate is desired.

The amount of acid acceptor employed is generally 0.5-30 weight percent, preferably 1-10 weight percent of the reaction medium and sufficient to form the chelate.

The chelate synthesis is preferably conducted in a nonoxidizing atmosphere. This can be accomplished, for example, by contacting the reactants in the presence of hydrogen, e.g., in the presence of from 0.1-60 atmospheres absolute hydrogen pressure or by adding hydrogen liberating components, e.g., sodium borohydride, lithium hydride, lithium aluminum hydride, etc., to produce hydrogen "in situ." A non-oxidizing atmosphere may also be maintained by performing the contacting in the presence of an inert gas such as carbon monoxide or nitrogen which can be maintained in the vapor space above the liquid reaction medium.

The proportions of the above-described reactants are preferably controlled within limits to achieve the chelates of the invention. Generally the molar amounts of halide, hydroxyl, or alkanoate are 0.1-3 times, preferably 0.5-2 times the atomic quantity of palladium present. The amount of biphyllic ligand, e.g., triphenylphosphine, can be reacted in a molar amount from 1 to about 10 times the atomic quantity of palladium. The ligand is preferably used in excess, e.g., 10-300%, most preferably 50-300% of that stoichiometrically required to form the palladium chelate.

The contacting may be performed under mild conditions and may be accomplished in a relatively short period. The chelate may be formed at temperatures between about 80° and 200° C., preferably between 100° and 150° C. and at pressures from 1–60 atmospheres absolute, preferably 1–10 atmospheres, sufficient to maintain liquid phase. As previously mentioned, the preferred non-oxidizing environment may be maintained by adding an inert gas, e.g., hydrogen, nitrogen or carbon monoxide to the reaction medium to provide the aforementioned pressures.

The identity of the particular "X" group associated with the chelate can result from the anions associated with the palladium source used in the reaction or can result from the choice of the particular acid acceptor or reaction solvent used in synthesis of the chelate. When a palladium halide, alkanoate or hydroxide is added to the reaction, as the source of palladium, "X" is, respectively, halide, alkanoate or hydroxyl in the chelate which is initially formed.

When alkonate or hydroxyl groups are to be associated with palladium as the "X" group, the reaction can be performed in the presence of alkanoate or hydroxide acid acceptors or in the presence of a fatty acid such as aforementioned. If the palladium is added in association with a different anion, e.g., a halide, the reaction can be continued so that the ultimate product recovered is the chelate having a hydroxyl group or the alkanoate corresponding to the acid acceptor. In such instances continuing the reaction in the presence of the alkanoate acid acceptor or a fatty acid for a period in excess of about 30 minutes at 100°–150° C. will yield an alkanoate palladium chelate as the major product.

The chelate product of the preceding reaction can be further reacted in accordance with this invention with any of the aforementioned aromatic-substituting reactants. Suitably, this reaction can be performed in the same reaction medium used for the preparation of the chelate simply by incorporation of any of the aforementioned aromatic-substituting reactants in the reaction medium followed by heating the reactants to the indicated temperatures and retaining a sufficient pressure on the reaction to maintain liquid phase conditions.

The aromatic substituting reaction can be used at a concentration from about 1:10 to about 10:1 molar proportions relative to the molar concentration of the chelate in the reaction medium. To insure substantially complete conversion to the ortho substituted aromatic derivative, the substituting reactant is preferably employed in molar excess quantities, e.g., from about 2:1 to about 10:1 molar proportions relative to the chelate reactant.

The reaction produces a complex of the ortho substituted aromatic ligand complex of the Group VIII metal, i.e., palladium or platinum. This material can be recovered by crystallization from the reaction medium and can be used as improved catalysts for hydrocarboxylation and hydroformylation reactions. As previously described, however, the ortho substituted aromatic ligand can be recovered as such from the reaction medium by treatment of the reaction medium or the crystallized solid obtained therefrom with an alkali metal cyanide. The cyanide displaces the ligand from the complex and forms a new cyano complex with the Group VIII metal. When this treatment is performed in the presence of an organic reaction medium such as any of those previously discussed, the ortho substituted aromatic ligand is dissolved in the organic medium and can be recoverd therefrom by distillation to remove the reaction medium and/or crystallization to recover the biphyllic ligand.

The invention will now be described by reference to specific examples which will illustrate modes of practice of the invention and illustrate results obtainable thereby.

EXAMPLE 1

A 100-milliliter flask is charged with 1.5 grams of a palladium triphenylphosphine chelate (1-chloro-1-triphenylphosphino - 2,2 - diphenyl-3,4-benzo-1-palladia-2-phosphocyclobutane) and 50 milliliters carbon tetrachloride. The reactants are heated to reflux and maintained at refluxing conditions for 15 minutes. Upon completion of the reaction period, the contents are cooled and 1 gram of a yellow solid is isolated which decomposes at 250°–255° C. The solid is analyzed and found to comprise dichloro triphenylphosphino diphenyl orthochlorophenylphosphino palladium having the following elemental analysis:

|  | Percent |
|---|---|
| Carbon | 61.2 |
| Hydrogen | 4.6 |
| Chlorine | 13.0 |

When the experiment is repeated with the substitution of 1-chloro-1-triphenyl-phosphino-2,2-diphenyl-3,4-benzo-1-platia-2-phosphocyclobutane for the previously described palladium chelate, a similar reaction occurs.

EXAMPLE 2

A flask of 250-milliliter capacity is charged with 1.0 gram of the palladium chelate such as used in the preceding example, 50 milliliters toluene and 0.5 gram benzylchloride. The flask contents are purged with carbon monoxide while the mixture is heated to reflux and maintained at refluxing conditions for 15 minutes. The reactants were then cooled and the liquid contents of the flask are mixed with 100 milliliters of heptane and a yellow-orange solid was formed which is isolated and found to decompose at 190°–200° C. having the following elemental analysis:

|  | Percent |
|---|---|
| Carbon | 63.6 |
| Hydrogen | 4.6 |
| Chlorine | 6.9 | corresponding to the following complex: dichloro triphenylphosphino diphenyl - orthobenzylphenylphosphino palladium.

EXAMPLE 3

A flask of 100-milliliter capacity is charged with 1.5 grams of the palladium chelate used in the preceding examples, 50 milliliters benzene and 1.6 grams of bromine. The mixture is heated to reflux and maintained at refluxing conditions for 15 minutes and then cooled and 50 milliliters methanol is added. The resulting mixture is filtered and the filtrate is concentrated on a steam bath to yield 1 gram of a brick-red solid which decomposes at 290°–292° C. and analyzes as palladium dibromide bis(diphenyl-o-bromophenylphosphine) having an elemental analysis of:

|  | Percent |
|---|---|
| Carbon | 43.1 |
| Hydrogen | 3.4 |
| Phosphorus | 5.9 |

When the experiment is repeated with substitution of iodine for the bromine, conversion to diiodo triphenylphosphino diphenyl-orthiodophenyl palladium occurs. This material has a melting point of 275°–280° C. and an elemental analysis of:

|  | Percent |
|---|---|
| Carbon | 42.1 |
| Hydrogen | 3.4 |
| Phosphorus | 6.5 |

EXAMPLE 4

A 50-milliliter flask is charged with 1.5 grams of the palladium chelate used in the preceding examples, 1 gram phenylchloro orthoformate and 30 milliliters benzene. The reactants are heated to reflux and maintained under reflux for 5 minutes. The reactants are then cooled and filtered to recover a filtrate which is concentrated to obtain a yellow solid decomposing at 284°–295° C. and analyzing for dichloro triphenylphosphino diphenyl o-phenoxyphosphino palladium with an elemental analysis of 62.8 percent carbon and 4.7 percent hydrogen.

EXAMPLE 5

A laboratory flask of 250-milliliter capacity is charged with 1.5 grams of the palladium chelate used in the preceding examples, 50 milliliters benzene and 1 gram ethyl chloroformate. The flask contents are purged with carbon monoxide and slowly heated to reflux and maintained at refluxing conditions for 5 minutes. The reactants are then cooled to obtain a clear yellow solution which is admixed with methanol and then concentrated to obtain 1 gram of a yellow precipitate which decomposes at 280°–285° C. and analyzes for dichloro triphenylphosphino diphenyl-o-ethoxyphenylphosphino palladium with a elemental analysis of 61.2 percent carbon, 4.6 percent hydrogen, 8.9 percent chlorine and 8.8 percent phosphorus.

EXAMPLE 6

A 50-milliliter capacity flask is charged with 0.5 gram palladium chloride bis-triphenylphosphine, 3-milliliters hydrochloric acid, 5 grams triphenylphosphine and 5-milliliters hydrazine hydrate. The mixture is heated to and maintained at reflux for one-half hour, cooled and a yellow solid is recovered. The solid has a decomposition point of 294° C. and an elemental analysis corresponding to $PdCl_2P_2C_{36}H_{25}Cl_5$.

EXAMPLE 7

A 500-milliliter capacity flask is charged with 200 milliliters acetic acid, 3 milliliters concentrated hydroiodic acid, 7 grams triphenylphosphine, 1 gram metallic palladium and 4 milliliters hydrazine hydrate. The flask contents are heated to and maintained at reflux for forty-eight hours, then cooled and a tan solid having a decomposition temperature of 291° C. is recovered. The solid analyzes as palladium dibromide triphenylphosphine diphenyl-o-bromophenylphosphine.

The preceding examples are intended solely to illustrate modes of practice of the invention and to illustrate results obtainable thereby. It is not intended that the invention be unduly limited by such illustrations, but rather, it is intended that the invention be defined by the reagents, conditions and steps and their obvious equivalents set forth in the following claims.

I claim:

1. A method for the substitution, in the ortho position, of a mono-cyclic aromatic group of a biphyllic ligand of Group V–A elements having atomic numbers greater than 15 which comprises contacting a chelate of said ligand with platinum or palladium having the following structure:

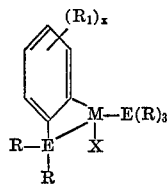

wherein E is a trivalent Group V–A element having an atomic number of at least 15;
M is palladium or platinum;
X is halide, hydroxyl, or alkanoate having 2 to about 12 carbons;
R is the same or different alkyl having 1 to 14 carbons, cycloalkyl having 5 to 10 carbons or hydrocarbyl aryl having 6 to 10 carbons;
$R_1$ is the same or different inert group of alkyl having 1 to about 5 carbons, cycloalkyl having from 5 to about 10 carbons or halo; and
$x$ is an integer from 0 to 3;

with an aromatic ring substituting reactant selected from the class consisting of halogens, hydrohalides, gem-halo-alkanes having from 1 to about 5 carbons and 2 to about 6 halides, alkyl non-gem halides having from 1 to about 12 carbons, alkyl chloroformates having from 1 to about 12 carbons in the alkyl group and aryl chloroformates having from 6 to about 12 carbons in the aromatic group, at reaction conditions comprising a temperature from 30° to about 300° C. and a pressure from 1 to about 1000 atmospheres, sufficient to maintain liquid phase conditions.

2. The method of claim 1 wherein M is palladium.
3. The method of claim 1 wherein said ring substituting reactant is a halogen.
4. The method of claim 1 wherein said ring substituting reactant is a gem-halo-alkane.
5. The method of claim 1 wherein said ring substituting reactant is a hydrohalide.
6. The method of claim 1 wherein said ring substituting reactant is an alkyl non-gem halide.
7. The method of claim 1 wherein said ring substituting reactant is an alkyl chloroformate.
8. The method of claim 1 wherein said ring substituting reactant is an aryl chloroformate.
9. A method for the substitution, in the ortho position, of a mono-cyclic aromatic group of a biphyllic ligand of Group V–A elements having atomic numbers greater than 15 which comprises contacting a palladium or platinum hydroxide, halide or alkanoate having from 1 to about 5 carbons with a biphyllic ligand having the formula:

$$E(R)_3$$ 

wherein E is a trivalent Group V–A element having an atomic number of at least 15; and
R is the same or different alkyl having 1 to about 14 carbons, cycloalkyl having 5 to about 10 carbons or hydrocarbon aryl having 6 to about 10 carbons, at least one of said R groups is phenyl or phenyl substituted with a $C_1$ to $C_5$ alkyl group; and from 0.5–30 weight percent of an acid acceptor, and aromatic ring substituting reactant selected from the class consisting of halogens, hydrohalides, gem-halo-alkanes having from 1 to about 5 carbons and 2 to about 6 halides, alkyl non-gem halides having from 1 to about 12 carbons and 1 to about 5 halides, alkyl chloroformates having from 1 to about 12 carbons in the alkyl group and aryl chloroformates having from 6 to about 12 carbons in the aromatic group at reaction conditions comprising a temperature from 30° C. to 300° C. and a pressure from 1 to about 1000 atmospheres.

10. The method of claim 9 wherein said contacting is performed in the presence of an acid acceptor selected from the group consisting of the alkali and alkaline earth metal hydroxides, carbonates, arsenates, borates, $C_1$ to $C_5$ carboxylates and oxides, ammonium hydroxide, hydrazine and $C_1$ to $C_5$ alkylamines.

11. The method of claim 1 wherein said biphyllic ligand is triphenylphosphine.

References Cited

UNITED STATES PATENTS 3,452,068  6/1969  Wilkinson _____ 260—439 R
3,459,780  8/1969  Wilkinson _____ 260—429 R
3,622,607  11/1971  Fenton _____ 260—429 R

OTHER REFERENCES

Coates et al. Organometallic Compounds, vol. II, Methwon and Co. Ltd., London, pp. 226-9.

PATRICK P. GARVIN, Primary Examiner
A. P. DEMERS, Assistant Examiner

U.S. Cl. X.R.
260—604